(12) United States Patent
Sawafta et al.

(10) Patent No.: US 11,199,368 B2
(45) Date of Patent: Dec. 14, 2021

(54) MODULAR AND PORTABLE FIXTURES CONTAINING A PHASE CHANGE MATERIAL

(71) Applicant: Phase Change Energy Solutions, Inc., Asheboro, NC (US)

(72) Inventors: Reyad I. Sawafta, Greensboro, NC (US); Furat Sawafta, Greensboro, NC (US)

(73) Assignee: Phase Change Energy Solutions, Inc., Asheboro, NC (US)

(*) Notice: Subject to any disclaimer, the term of this patent is extended or adjusted under 35 U.S.C. 154(b) by 396 days.

(21) Appl. No.: 15/755,646

(22) PCT Filed: Aug. 31, 2016

(86) PCT No.: PCT/US2016/049594
§ 371 (c)(1),
(2) Date: Feb. 27, 2018

(87) PCT Pub. No.: WO2017/040591
PCT Pub. Date: Mar. 9, 2017

(65) Prior Publication Data
US 2020/0232720 A1  Jul. 23, 2020

Related U.S. Application Data

(60) Provisional application No. 62/212,054, filed on Aug. 31, 2015.

(51) Int. Cl.
*F28D 20/02* (2006.01)
*A47B 96/20* (2006.01)
(Continued)

(52) U.S. Cl.
CPC ......... *F28D 20/023* (2013.01); *F28D 20/028* (2013.01); *A47B 96/20* (2013.01);
(Continued)

(58) Field of Classification Search
CPC ............... F28D 20/023; F28D 20/028; F28D 2020/0017; F28D 20/02; F28D 2020/0008;
(Continued)

(56) References Cited

U.S. PATENT DOCUMENTS 6,230,444 B1 * 5/2001 Pause .................. F28D 20/023
52/1
2005/0244625 A1 11/2005 Pause
(Continued)

FOREIGN PATENT DOCUMENTS

CN 101476750 A 7/2009
DE 1801088 A1 5/1970
(Continued)

OTHER PUBLICATIONS

International Search Report and Written Opinion from the ISA at the European Patent Office, regarding International Application No. PCT/2016/049594, dated Nov. 17, 2016, 12 pages.

*Primary Examiner* — Steve S Tanenbaum
(74) *Attorney, Agent, or Firm* — E. Eric Mills; Nexsen Pruet, PLLC

(57) ABSTRACT

In one aspect, methods of managing the temperature of a room are described herein. In some embodiments, such a method described herein comprises disposing a fixture in an interior of the room, wherein the fixture comprises or contains a phase change material. Additionally, in some cases, the fixture is a decorative fixture, such as a piece of artwork.

20 Claims, 12 Drawing Sheets

(51) Int. Cl.
  *A47G 1/02* (2006.01)
  *F24F 5/00* (2006.01)
  *F28D 20/00* (2006.01)

(52) U.S. Cl.
  CPC ............ *A47G 1/02* (2013.01); *F24D 2220/10* (2013.01); *F24F 5/0021* (2013.01); *F28D 2020/0008* (2013.01)

(58) Field of Classification Search
  CPC .. A47B 96/20; A47G 1/02; A47G 1/06; F24D 2220/10; F24F 5/0021; Y02E 60/14; C09K 5/063
  USPC .......................................................... 165/10
  See application file for complete search history.

(56) References Cited

U.S. PATENT DOCUMENTS

| | | | |
|---|---|---|---|
| 2009/0173336 A1 | 7/2009 | Leifer et al. | |
| 2011/0292488 A1 | 12/2011 | McCarthy et al. | |
| 2014/0208517 A1 | 7/2014 | Gross et al. | |

FOREIGN PATENT DOCUMENTS

| | | | | |
|---|---|---|---|---|
| EP | 1703033 A2 * | 9/2006 | ............ | F28D 20/02 |
| EP | 2781842 A2 | 9/2014 | | |
| GB | 2351550 A | 1/2001 | | |
| GB | 2424062 A | 9/2006 | | |
| GB | 2490897 A | 11/2012 | | |
| WO | 2003064931 A1 | 8/2003 | | |
| WO | 2009105643 A2 | 8/2009 | | |
| WO | 2014018062 A1 | 1/2014 | | |

\* cited by examiner

MODULAR AND PORTABLE FIXTURES CONTAINING A PHASE CHANGE MATERIAL

CROSS REFERENCE TO RELATED APPLICATIONS

This application is the national stage application under 35 U.S.C. § 371 of International Application No. PCT/US2016/049594, filed on Aug. 31, 2016, which claims priority pursuant to 35 U.S.C. § 119 to U.S. Provisional Patent Application Ser. No. 62/212,054, filed Aug. 31, 2015, each of which is hereby incorporated by reference in its entirety.

FIELD

The present disclosure relates to modular and portable fixtures containing a phase change material (PCM) or latent heat storage material, and to methods of managing the temperature of a space or room using such fixtures.

BACKGROUND

In recent years, homeowners and business owners have sought to reduce energy consumption and costs associated with managing or maintaining the temperature of a building or room. Various energy-saving devices and systems have been implemented for this purpose. However, many existing devices and systems suffer from one or more disadvantages. For example, some devices and systems address only the thermal insulation of a room or building from outdoor temperatures. In addition, many devices and systems require permanent and/or expensive installation within a room or building. As a result, many existing devices and systems fail to provide rapid recouping of their initial cost and/or require substantial retrofitting or refurbishment of the room or building in which they are used. The high cost and/or effort of installing some previous devices and systems can also hinder the widespread adoption of such devices and systems in homes and businesses. Improved systems and methods for managing the temperature of a room or building are therefore desired.

SUMMARY

In one aspect, modular and portable fixtures containing or comprising a PCM are described herein. Such fixtures, in some cases, can provide one or more advantages compared to some existing fixtures. In some embodiments, for example, a fixture described herein can provide decoration to a room or space while also helping to maintain a desired temperature of the room or space and/or while reducing the energy used by a heating, ventilating, and air conditioning (HVAC) system of the space or room. Additionally, in some instances, a fixture described herein is modular, portable, and/or removable, such that it can be readily removed from a space or room and/or moved to another space or room or to another location within a space or room, including without the need for complex or time-consuming installation or de-installation of the fixture.

Fixtures described herein comprise or contain one or more PCMs. In some cases, a fixture described herein is a decorative fixture, such as a piece of artwork. Further, in some such instances, the fixture comprises a frame and the PCM is disposed within a cavity defined by the frame or within an interior of a periphery defined by the frame. Moreover, the fixture can have a front side and a back side. In some cases, the PCM of the fixture is disposed on the back side of the fixture, and the front side of the fixture is decorative. For example, in some instances, the fixture is a framed piece of artwork having a PCM disposed behind the frame or within the frame. A fixture described herein may also be an item of furniture or a portion of an item of furniture, such as a bed or portion of a bed. In some embodiments, a fixture described herein is a mirror such as a large bathroom mirror. A fixture described herein may also be a smart board, chalk board, white board, or other board disposed in a school, classroom, or conference room. Additionally, in some cases, a fixture described herein comprises informational content. For example, in some embodiments, a fixture described herein can be a banner or display board, such as a banner or display board comprising menu information and/or an advertisement. Further, in some cases, a fixture described herein is a load bar or piece of molding disposed on the wall of a room. A fixture described herein can also be hung or suspended from the ceiling of a room, including to provide a decorative effect. Moreover, in some embodiments, a fixture described herein provides structure or subdivision to a room. For instance, in some cases, a fixture can form at least a portion of a cubicle or workstation wall or division within a room. A fixture described herein may also form at least a portion of a ceiling tile, such as a drop ceiling tile. Additionally, in some instances, a fixture described herein comprises or forms an acoustic tile or part of an acoustic tile.

In another aspect, methods of managing the temperature of a space or room are described herein. Such methods can provide one or more advantages compared to some other methods of managing the temperature of a space or room. For instance, in some cases, methods described herein can reduce the number of HVAC heating or cooling cycles necessary to maintain a temperature within a predetermined or desired range. Further, in some embodiments, methods described herein can reduce energy expenditures required to run an HVAC system to manage the temperature of a room.

In some implementations, a method of managing the temperature of a room comprises disposing a fixture in an interior of the room, wherein the fixture comprises or contains a PCM. In addition, the fixture can be disposed within the room in any manner not inconsistent with the objectives of the present disclosure. For example, the fixture can hang from (and/or be incorporated into) a wall of the room or be suspended from (and/or be incorporated into) a ceiling of the room. A fixture described herein may also be placed on a floor of the room. Additionally, as described above, the fixture can be decorative, and may comprise or include a piece of artwork. In certain other embodiments, the fixture is an item of furniture or a portion of an item of furniture. The fixture may also be a load bar or piece of molding. Further, in some cases, the fixture forms a portion of a structural component of the room. For instance, in some embodiments, the fixture forms a portion of an interior wall or ceiling such as a drop ceiling. A method described herein can further comprise changing the phase of the PCM from a first phase to a second phase by exposing the PCM to a temperature in the room above or below a phase change temperature of the PCM. Additionally, in some instances, the method can further comprise reverting or returning the PCM to the first phase. Reverting the PCM to the first phase, in some embodiments, comprises cooling or heating the room with an HVAC system. In certain other embodiments, reverting the PCM to the first phase comprises cooling or heating the room naturally, such as by exposing the room to the outdoors or to a day-night cycle. Heating or cooling the room in this manner can revert the PCM to the first phase by causing the PCM to absorb thermal energy from the room or release thermal energy to the room as part of a phase transition of the PCM back to the first phase from the second phase.

These and other implementations are described in more detail in the detailed description which follows.

DETAILED DESCRIPTION

Figure 1:
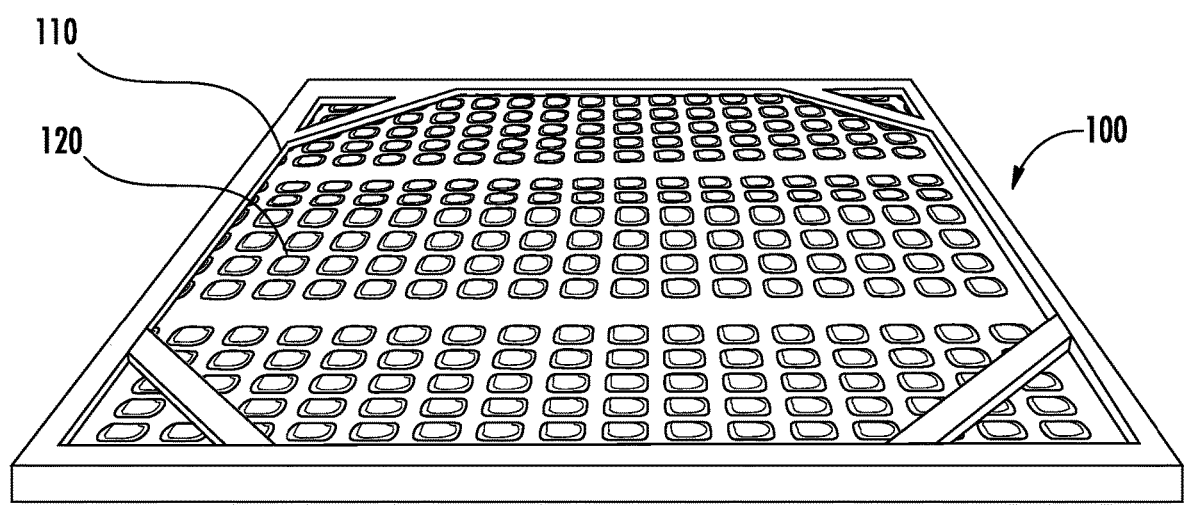
FIG. 1 illustrates a perspective view of the back of a fixture according to one embodiment described herein.

Implementations described herein can be understood more readily by reference to the following detailed description, examples, and drawings. Elements, apparatus, and methods described herein, however, are not limited to the specific implementations presented in the detailed description, examples, and drawings. It should be recognized that these implementations are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points of 5 and 10.

In one aspect, fixtures comprising one or more PCMs are described herein. In another aspect, methods of managing the temperature of a room are described herein, wherein the room has a wall and a ceiling and wherein the methods comprise disposing a fixture described herein in an interior of the room.

Turning now to specific components and steps of fixtures and methods described herein, a fixture described herein comprises one or more PCMs. Any PCM not inconsistent with the objectives of the present invention can be used. Further, a PCM in a fixture utilized in a method described herein can either absorb or release energy using any phase transition not inconsistent with the objectives of the present disclosure. For example, the phase transition of a PCM described herein, in some embodiments, comprises a transition between a solid phase and a liquid phase of the PCM, or between a solid phase and a mesophase of the PCM. A mesophase, in some cases, is a gel phase. Thus, in some instances, a PCM undergoes a solid-to-gel transition. In some embodiments, the gel of a solid-to-gel transition does not comprise a continuous liquid phase. Further, in some cases, the gel of a solid-to-gel transition does not comprise water or is substantially free of water. Moreover, in other instances, the solid-to-gel transition of a PCM described herein does not comprise a formal phase change. In some embodiments, for example, the solid-to-gel transition is a transition in viscosity from a high viscosity to a low viscosity. The high viscosity comprises a viscosity of at least about 25,000 centipoise (cP) when measured according to ASTM standard D2983. The low viscosity comprises a viscosity of about 20,000 cP or less when measured according to ASTM standard D2983. Further, in some embodiments, the low viscosity comprises a viscosity between about 200 cP and about 20,000 cP, a viscosity between about 200 cP and about 10,000 cP, between about 1000 cP and about 15,000 cP, or between about 1000 cP and about 5000 cP. Moreover, in some cases, the solid-to-gel transition of a PCM described herein comprises a transition from a rigid solid state to a flexible solid state of the PCM. In some instances, the rigid solid state comprises an amorphous solid state. Alternatively, in other embodiments, the rigid solid state comprises a crystalline solid state. The flexible solid state, in some cases, comprises an amorphous state. In other embodiments, the flexible solid state comprises a crystalline state. Further, a PCM in a rigid solid state, in some instances, has a viscosity of about 25,000 cP or more when measured according to ASTM standard D2983. In contrast, a PCM in a flexible solid state, in some embodiments, has a viscosity of about 20,000 cP or less when measured according to ASTM standard D2983. In some cases, a PCM in a flexible solid state has a viscosity between about 200 cP and about 20,000 cP, between about 200 cP and about 10,000 cP, between about 1000 cP and about 15,000 cP, or between about 1000 cP and about 5000 cP when measured according to ASTM standard D2983.

In addition, a PCM of a fixture described herein can have any phase transition temperature not inconsistent with the objectives of the present disclosure. A phase transition temperature of a PCM or mixture of PCMs, in some embodiments, is between about −50° C. and about 90° C. at 1 atm, between about −20° C. and about 90° C. at 1 atm, or between about −20° C. and about 80° C. at 1 atm. In some cases, a phase transition temperature is between about −50° C. and about 0° C. at 1 atm or between about −20° C. and about 0° C. at 1 atm. In some instances, a phase transition temperature is between about 0° C. and about 20° C. at 1 atm or between about 0° C. and about 10° C. at 1 atm. In some embodiments, a phase transition temperature is between about 5° C. and about 10° C. at 1 atm. In other cases, a phase transition temperature is between about 30° C. and about 90° C. at 1 atm or between about 50° C. and about 70° C. at 1 atm. In some embodiments, a phase transition temperature is between about 55° C. and about 65° C. at 1 atm.

Moreover, in some cases, a PCM or mixture of PCMs is selected to provide a phase transition temperature selectively adapted for heating or cooling applications. In certain embodiments it may be desirable or even preferable that a phase transition temperature is at or near a desired set-point temperature in an interior of the room. Any desired room temperature and associated phase transition temperature can be used. For example, in some embodiments, a phase transition temperature is between about 15° C. and about 32° C. at 1 atm, such as between about 17° C. and about 30° C. at 1 atm, between about 19° C. and about 28° C., or between about 21° C. and about 26° C. at 1 atm. Further, in some cases, a phase transition temperature is between about 17° C. and about 32° C. at 1 atm, such as between about 19° C. and about 32° C. at 1 atm, between about 21° C. and about 32° C. at 1 atm, between about 23° C. and about 32° C. at 1 atm, or between about 25° C. and about 32° C. at 1 atm. Moreover, in some embodiments, a phase transition temperature is between about 15° C. and about 30° C. at 1 atm, such as between about 15° C. and about 28° C. at 1 atm, between about 15° C. and about 26° C. at 1 atm, or between about 15° C. and about 24° C. at 1 atm.

Moreover, in some cases, a PCM or mixture of PCMs has a phase transition enthalpy of at least about 50 kJ/kg or at least about 100 kJ/kg. In other embodiments, a PCM or mixture of PCMs has a phase transition enthalpy of at least about 150 kJ/kg, at least about 200 kJ/kg, at least about 300 kJ/kg, or at least about 350 kJ/kg. In some instances, a PCM or mixture of PCMs has a phase transition enthalpy between about 50 kJ/kg and about 350 kJ/kg, between about 100 kJ/kg and about 350 kJ/kg, between about 100 kJ/kg and about 220 kJ/kg, or between about 100 kJ/kg and about 250 kJ/kg.

In addition, a PCM of a fixture described herein can have any composition not inconsistent with the objectives of the present disclosure. In some embodiments, for instance, a PCM comprises an inorganic composition. In other cases, a PCM comprises an organic composition. In some instances, a PCM comprises a salt hydrate. Suitable salt hydrates include, without limitation, $CaCl_2 \cdot 6H_2O$, $Ca(NO_3)_2 \cdot 3H_2O$, $NaSO_4 \cdot 10H_2O$, $Na(NO_3)_2 \cdot 6H_2O$, $Zn(NO_3)_2 \cdot 2H_2O$, $FeCl_3 \cdot 2H_2O$, $Co(NO_3)_2 \cdot 6H_2O$, $Ni(NO_3)_2 \cdot 6H_2O$, $MnCl_2 \cdot 4H_2O$, $CH_3COONa \cdot 3H_2O$, $LiC_2H_3O_2 \cdot 2H_2O$, $MgCl_2 \cdot 4H_2O$, $NaOH \cdot H_2O$, $Cd(NO_3)_2 \cdot 4H_2O$, $Cd(NO_3)_2 \cdot 1H_2O$, $Fe(NO_3)_2 \cdot 6H_2O$, $NaAl(SO_4)_2 \cdot 12H_2O$, $FeSO_4 \cdot 7H_2O$, $Na_3PO_4 \cdot 12H_2O$, $Na_2B_4O_7 \cdot 10H_2O$, $Na_3PO_4 \cdot 12H_2O$, $LiCH_3COO \cdot 2H_2O$, and/or mixtures thereof.

In other embodiments, a PCM comprises a fatty acid. A fatty acid, in some embodiments, can have a C4 to C28 aliphatic hydrocarbon tail. Further, in some embodiments, the hydrocarbon tail is saturated. Alternatively, in other embodiments, the hydrocarbon tail is unsaturated. In some embodiments, the hydrocarbon tail can be branched or linear. Non-limiting examples of fatty acids suitable for use in some embodiments described herein include caprylic acid, capric acid, lauric acid, myristic acid, palmitic acid, stearic acid, arachidic acid, behenic acid, lignoceric acid, and cerotic acid. In some embodiments, a PCM described herein comprises a combination, mixture, or plurality of differing fatty acids.

In some embodiments, a PCM comprises an alkyl ester of a fatty acid. Any alkyl ester not inconsistent with the objectives of the present disclosure may be used. For instance, in some embodiments, an alkyl ester comprises a methyl ester, ethyl ester, isopropyl ester, butyl ester, or hexyl ester of a fatty acid described herein. In other embodiments, an alkyl ester comprises a C2 to C6 ester alkyl backbone or a C6 to C12 ester alkyl backbone. In some embodiments, an alkyl ester comprises a C12 to C28 ester alkyl backbone. Further, in some embodiments, a PCM comprises a combination, mixture, or plurality of differing alkyl esters of fatty acids. Non-limiting examples of alkyl esters of fatty acids suitable for use in some embodiments described herein include methyl laurate, methyl myristate, methyl palmitate, methyl stearate, methyl palmitoleate, methyl oleate, methyl linoleate, methyl docosahexanoate, methyl ecosapentanoate, ethyl laurate, ethyl myristate, ethyl palmitate, ethyl stearate, ethyl palmitoleate, ethyl oleate, ethyl linoleate, ethyl docosahexanoate, ethyl ecosapentanoate, isopropyl laurate, isopropyl myristate, isopropyl palmitate, isopropyl stearate, isopropyl palmitoleate, isopropyl oleate, isopropyl linoleate, isopropyl docosahexanoate, isopropyl ecosapentanoate, butyl laurate, butyl myristate, butyl palmitate, butyl stearate, butyl palmitoleate, butyl oleate, butyl linoleate, butyl docosahexanoate, butyl ecosapentanoate, hexyl laurate, hexyl myristate, hexyl palmitate, hexyl stearate, hexyl palmitoleate, hexyl oleate, hexyl linoleate, hexyl docosahexanoate, and hexyl ecosapentanoate.

In some embodiments, a PCM comprises a fatty alcohol. Any fatty alcohol not inconsistent with the objectives of the present disclosure may be used. For instance, a fatty alcohol, in some embodiments, can have a C4 to C28 aliphatic hydrocarbon tail. Further, in some embodiments, the hydrocarbon tail is saturated. Alternatively, in other embodiments, the hydrocarbon tail is unsaturated. The hydrocarbon tail can also be branched or linear. Non-limiting examples of fatty alcohols suitable for use in some embodiments described herein include capryl alcohol, pelargonic alcohol, capric alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, arachidyl alcohol, heneicosyl alcohol, behenyl alcohol, lignoceryl alcohol, ceryl alcohol, and montanyl alcohol. In some embodiments, a PCM comprises a combination, mixture, or plurality of differing fatty alcohols.

In some embodiments, a PCM comprises a fatty carbonate ester, sulfonate, or phosphonate. Any fatty carbonate ester, sulfonate, or phosphonate not inconsistent with the objectives of the present disclosure may be used. In some embodiments, a PCM comprises a C4 to C28 alkyl carbonate ester, sulfonate, or phosphonate. In some embodiments, a PCM comprises a C4 to C28 alkenyl carbonate ester, sulfonate, or phosphonate. In some embodiments, a PCM comprises a combination, mixture, or plurality of differing fatty carbonate esters, sulfonates, or phosphonates. In addition, a fatty carbonate ester described herein can have two alkyl or alkenyl groups described herein or only one alkyl or alkenyl group described herein.

Moreover, in some embodiments, a PCM comprises a paraffin. Any paraffin not inconsistent with the objectives of the present disclosure may be used. In some embodiments, a PCM comprises n-dodecane, n-tridecane, n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, n-nonacosane, n-triacontane, n-hentriacontane, n-dotriacontane, n-tritriacontane, and/or mixtures thereof.

In addition, in some embodiments, a PCM comprises a polymeric material. Any polymeric material not inconsistent with the objectives of the present disclosure may be used. Non-limiting examples of suitable polymeric materials for use in some embodiments described herein include thermoplastic polymers (e.g., poly(vinyl ethyl ether), poly(vinyl n-butyl ether) and polychloroprene), polyethylene glycols (e.g., CARBOWAX® polyethylene glycol 400, CARBOWAX® polyethylene glycol 600, CARBOWAX® polyethylene glycol 1000, CARBOWAX® polyethylene glycol 1500, CARBOWAX® polyethylene glycol 4600, CARBOWAX® polyethylene glycol 8000, and CARBOWAX® polyethylene glycol 14,000), and polyolefins (e.g., lightly crosslinked polyethylene and/or high density polyethylene).

Additional non-limiting examples of phase change materials suitable for use in some embodiments described herein include BioPCM materials commercially available from Phase Change Energy Solutions (Asheboro, N.C.), such as BioPCM-(-8), BioPCM-(-6), BioPCM-(-4), BioPCM-(-2), BioPCM-4, BioPCM-6, BioPCM 08, BioPCM-Q12, BioPCM-Q15, BioPCM-Q18, BioPCM-Q20, BioPCM-Q21, BioPCM-Q23, BioPCM-Q25, BioPCM-Q27, BioPCM-Q30, BioPCM-Q32, BioPCM-Q35, BioPCM-Q37, BioPCM-Q42, BioPCM-Q49, BioPCM-55, BioPCM-60, BioPCM-62, BioPCM-65, BioPCM-69, and others.

It is further to be understood that a fixture utilized in a method described herein can comprise a plurality of differing PCMs, including differing PCMs of differing types. Any mixture or combination of differing PCMs not inconsistent with the objectives of the present disclosure may be used. In some embodiments, for example, a fixture comprises one or more fatty acids and one or more fatty alcohols. Further, as described above, a plurality of differing PCMs, in some cases, is selected based on a desired phase transition temperature and/or latent heat of the mixture of PCMs.

Further, in some embodiments, one or more properties of a PCM described herein can be modified by the inclusion of one or more additives. Such an additive described herein can be mixed with a PCM and/or disposed in a fixture described herein. In some embodiments, an additive comprises a thermal conductivity modulator. A thermal conductivity modulator, in some embodiments, increases the thermal conductivity of the PCM. In some embodiments, a thermal conductivity modulator comprises carbon, including graphitic carbon. In some embodiments, a thermal conductivity modulator comprises carbon black and/or carbon nanoparticles. Carbon nanoparticles, in some embodiments, comprise carbon nanotubes and/or fullerenes. In some embodiments, a thermal conductivity modulator comprises a graphitic matrix structure. In other embodiments, a thermal conductivity modulator comprises an ionic liquid. In some embodiments, a thermal conductivity modulator comprises a metal, including a pure metal or a combination, mixture, or alloy of metals. Any metal not inconsistent with the objectives of the present disclosure may be used. In some embodiments, a metal comprises a transition metal, such as silver or copper. In some embodiments, a metal comprises an element from Group 13 or Group 14 of the periodic table. In some embodiments, a metal comprises aluminum. In some embodiments, a thermal conductivity modulator comprises a metallic filler dispersed within a matrix formed by the PCM. In some embodiments, a thermal conductivity modulator comprises a metal matrix structure or cage-like structure, a metal tube, a metal plate, and/or metal shavings. Further, in some embodiments, a thermal conductivity modulator comprises a metal oxide. Any metal oxide not inconsistent with the objectives of the present disclosure may be used. In some embodiments, a metal oxide comprises a transition metal oxide. In some embodiments, a metal oxide comprises alumina.

In other embodiments, an additive comprises a nucleating agent. A nucleating agent, in some embodiments, can help avoid subcooling, particularly for PCMs comprising finely distributed phases, such as fatty alcohols, paraffinic alcohols, amines, and paraffins. Any nucleating agent not inconsistent with the objectives of the present disclosure may be used.

Figure 2:
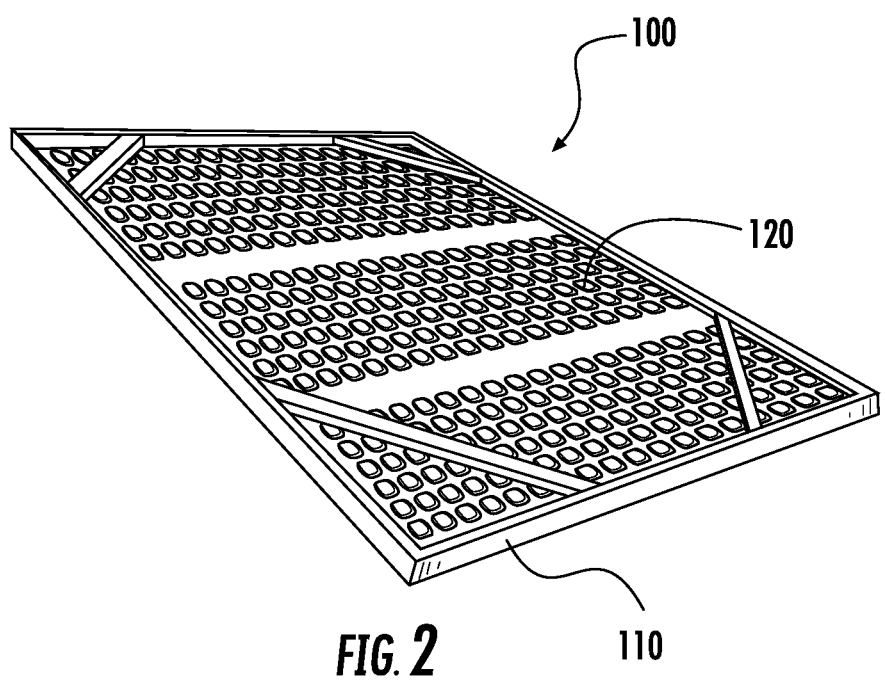
FIG. 2 illustrates a perspective view of the back of a fixture according to one embodiment described herein.

Turning now to specific properties or characteristics of the fixture comprising one or more PCMs, the fixture can be decorative or non-decorative. The fixture may also convey information or other content. For example, in some instances, the fixture comprises an advertisement, which may include images and/or text. In some cases, the fixture comprises a menu board or other informational board or banner. Additionally, in some embodiments, a fixture is decorative. For example, the fixture can be a piece of artwork, such as a picture, a painting, a print, sculpture or other piece of artwork. Moreover, a fixture can have decorative and/or other components disposed on or within the fixture in any configuration not inconsistent with the objectives of the present disclosure. For example, in some embodiments, the fixture can comprise a frame, and phase change material can be disposed on or within an area defined by the frame. In some embodiments, the fixture comprises a frame and the PCM is disposed on an exterior surface of the frame. Further, in some embodiments wherein the fixture comprises a frame, the phase change material is disposed within a cavity defined by the frame. In such embodiments, the frame can be hollow or substantially hollow, with the PCM being located within the frame. Moreover, in some embodiments, a frame of the fixture can define a periphery of any shape, such as a circular, oblong or polygonal shape, and the PCM can be disposed within an interior of the periphery. FIGS. 1 and 2 illustrate embodiments wherein the fixture (100) comprises a frame (110) defining a periphery (which may also be denoted as 110) and the PCM (120) is disposed within the periphery of the frame (110).

Additionally, in some embodiments, a fixture described herein can have a front side and a back side, and certain components or portions of the fixture can be selectively disposed on the front side or the back side. For example, in some embodiments, as illustrated in FIGS. 1 and 2, the fixture (100) has a front side (not visible) and a back side (visible in FIGS. 1 and 2), and the PCM (120) is located or disposed on the back side of the fixture (100). In such embodiments, the front side can be a decorative side. As described previously, the decorative side of a fixture can be a painting, print, poster, or the like.

Moreover, in some embodiments, the fixture may be adapted or configured to permit or facilitate heat exchange back and forth between the PCM and the interior of the room in which the fixture is disposed. Any configuration or architecture operable to provide such function can be used. For example, in some embodiments, the front side of the fixture comprises, includes, or is formed from a thermal exchange material or a thermally conductive material. Any material operable to permit thermal exchange from the front of the fixture to the back of the fixture and from the back of the fixture to the front of the fixture can be used. For example, in some cases, the front side of the fixture comprises, includes, or is formed from a metal such as aluminum or copper. Moreover, in some instances, the front side of the fixture is formed from a metal, and the metal is etched or printed or infused with one or more colorants to produce text and/or an image on the metal front side itself. Additionally, in some embodiments, the thermal exchange material or thermally conductive material of a front side of a fixture described herein can comprise or consist of a layer of thermally conductive material, including a thin layer of thermally conductive material. Further, in some cases, the thermally conductive material can be dispersed within a non-thermally conductive material or within a less thermally conductive material. In some embodiments, for example, a thermally conductive material comprises a paint, ink, or pigment, or a metal dispersed in a paint, ink, or pigment. Moreover, the paint, ink, or pigment can be used to form an artwork or decorative feature of the fixture. Such a use of thermally conductive paint, ink, or pigment may be especially useful if the front of the fixture is formed of a non-breathable material. It is also possible for the front side (or other portion) of a fixture described herein to be formed from a material that is non-thermally conductive and/or non-electrically conductive. The use of a non-conductive material to form a front side (or other portion) of a fixture described herein may be especially desirable, for example, if the fixture is placed in a room in which sensitive and/or expensive electronic devices are used, such as a telecommunications data room or data center in which computer systems and associated components are housed.

Additionally, in some embodiments, the front side of the fixture can comprise or be formed from a breathable material. A "breathable" material, for reference purposes herein, can refer to a material that is permeable to air and/or water vapor under ambient conditions, such as under a pressure of 1 atm. Not intending to be bound by theory, it is believed that air or water vapor passing back and forth across the front side of the fixture can permit heat exchange between the interior of the room and the PCM disposed on the back of the fixture. Any breathable material can be used in such a fixture. For example, the breathable material can be a fabric, leather, mesh, paper, or combination thereof. Moreover, a breathable material can be formed of a natural material or substrate or a synthetic material or substrate, including a natural or synthetic fabric, leather, mesh, or paper. A breathable material may also be formed from a metal. In some such instances, the breathable material comprises, consists, or consists essentially of a metal mesh or a perforated metal, such as an aluminum mesh or perforated aluminum.

Moreover, in some cases, the front side (or other portion) of a fixture described herein comprises or is formed from a non-flammable or non-combustible material. In some embodiments, for instance, such a material complies with the standard ASTM E 136 for non-combustible building materials and/or has a flammability rating of 0 or 1 in the National Fire Protection Associated (NAFPA) hazard rating system. Any non-flammable or non-combustible material can be used in a fixture described herein. For example, in some embodiments, a non-flammable or non-combustible material comprises glass, metal, or a non-flammable or non-combustible organic polymer. In some cases, a non-flammable or non-combustible material comprises a fire-resistant or fire-retardant textile or fabric, such as a polyester textile or fabric or a glass fiber textile or fabric.

Further, in some embodiments, a fixture described herein comprises a spacer that defines an air flow channel that permits air flow from the interior of the room to the PCM and from the PCM to the interior of the room. A spacer can take any form or have any architecture or configuration not inconsistent with the objectives of the present disclosure. For example, in an embodiment wherein the fixture is a painting, mirror, or other wall hanging, a bar-shaped or block-shaped spacer along a periphery of the fixture can penult air flow between the PCM and an interior of the room. The air flow channel defined by the spacer can have any dimensions not inconsistent with the objectives of the present disclosure. For example, the air flow channel can have a width of less than about 6 inches, such as between about 0.5 inches and about 6 inches, between about 0.5 inches and about 5 inches, between about 0.5 inches and about 4 inches, between about 0.5 inches and about 3 inches, or between about 0.5 inches and about 2 inches. Further, in some embodiments, a width of the air flow channel defined by the spacer is between about 1 inch and about 6 inches, between about 2 inches and about 6 inches, or between about 3 inches and about 6 inches. The air flow channel can be disposed along a top portion, bottom portion, or side portion of the fixture. In some embodiments, multiple spacers may be utilized to provide one or more air flow channels along a combination of the top portion, bottom portion, and/or side portion of the fixture. Further, in some embodiments, a fixture can define at least one vent hole in combination with or instead of a spacer to define an air flow channel that permits air flow from the interior of the room to the PCM and from the PCM to the interior of the room. Such a vent hole can have any dimensions not inconsistent with the objectives of the present disclosure. For example, a vent hole can have dimensions consistent with those provided herein above for a width dimension of the air flow channel. In embodiments wherein the fixture has one or more of a width dimension or a length dimension on the order of several feet or more, a vent hole can further define an air flow channel having a length or a width between about 6 inches and about 12 inches, such as between about 7 inches and about 12 inches, between about 8 inches and about 12 inches, between about 6 inches and about 11 inches or between about 6 inches and about 10 inches. Other dimensions are also possible, such as between about 6 inches and about 18 inches, between about 8 inches and about 20 inches, or between about 12 inches and about 24 inches. Moreover, an air flow channel and/or vent hole described herein can be partially defined by a ceiling, wall, or other component of a room in which the fixture is disposed. In other words, a spacer described herein, in some cases, provides or creates an air flow channel adjacent to a surface of a ceiling, wall, or other component of a room when the fixture is disposed on or near the ceiling, wall, or other component of the room.

A fixture described herein can also comprise or include one or more additional components that may either facilitate the temperature management function or may provide auxiliary function. For example, in some embodiments, the fixture comprises at least one fan that directs air flow from an interior of the room to the phase change material and/or from the phase change material to the interior of the room. In some cases, the fixture comprises a plurality of fans. In some such instances, a fixture can comprise a first fan (or plurality of fans) that rotates in a clockwise direction and a second fan (or plurality of fans) that rotates in a counterclockwise direction. Moreover, the first and second fans (or pluralities of fans) can be positioned in or on the fixture to direct air flow cooperatively from the interior of the room to the phase change material and from the phase change material back to the interior of the room. Further, in some embodiments, a fixture described herein can comprise or include one or more light sources such as a night light or a safety light. Moreover, the fixture may comprise or include a means by which to power the light source(s) and/or the fan(s). For example, the fixture can comprise or include a photovoltaic cell that powers the fan(s) and/or the light source(s). Such a photovoltaic cell may be placed on an exterior surface of the fixture, and may be a rigid or flexible photovoltaic cell. In other embodiments, the fan(s) are thermoelectrically powered. Moreover, in some cases, a thermoelectric fan of a fixture described herein uses thermal energy provided by or emanating from the fixture or by a heat source within the room or by "excess" ambient heat within the room. In this manner, such a thermoelectric fan can further assist with the efficient temperature management of the room, particularly for cooling applications. Any combination or sub-combination of one or more fans, one or more light sources, and one or more power sources such as a photovoltaic cell can be used.

Moreover, in some embodiments, the fixture is an item of furniture or a portion of an item of furniture. Any item of furniture can be used. For example, the fixture can be at least a portion of any household item of furniture or any item of furniture which may be disposed within a hotel room, other residential environment, or office environment, such as a data center. In some embodiments, the fixture is at least a portion of a dresser, wardrobe, night stand, shelf, desk, TV stand, bed, lamp, and/or a chair. For example, in some embodiments, the fixture is a bed or a portion of a bed, such as a headboard or a bed frame. Additionally, the fixture can be a stand, base or other support feature of an item of furniture such as a lamp. In some embodiments, the fixture is a mirror or comprises a mirror such as a bathroom mirror.

Further, in some cases, a fixture described herein comprises informational content. For example, in some embodiments, a fixture described herein can be a banner or display board, such as a banner or display board comprising menu information, daily special information, and/or an advertisement. In some instances, the fixture is a smart board, chalk board, white board, or other board disposed in a school, classroom, or conference room.

Moreover, in some embodiments, a fixture described herein provides structure or subdivision to a room. For instance, in some cases, a fixture can form at least a portion of a cubicle or workstation wall or division within a room. Further, it is also possible for a fixture described herein to be attached to and/or hung from a wall of a cubicle or workstation, wherein the wall of the cubicle or workstation is not itself a fixture described herein.

Figure 3:
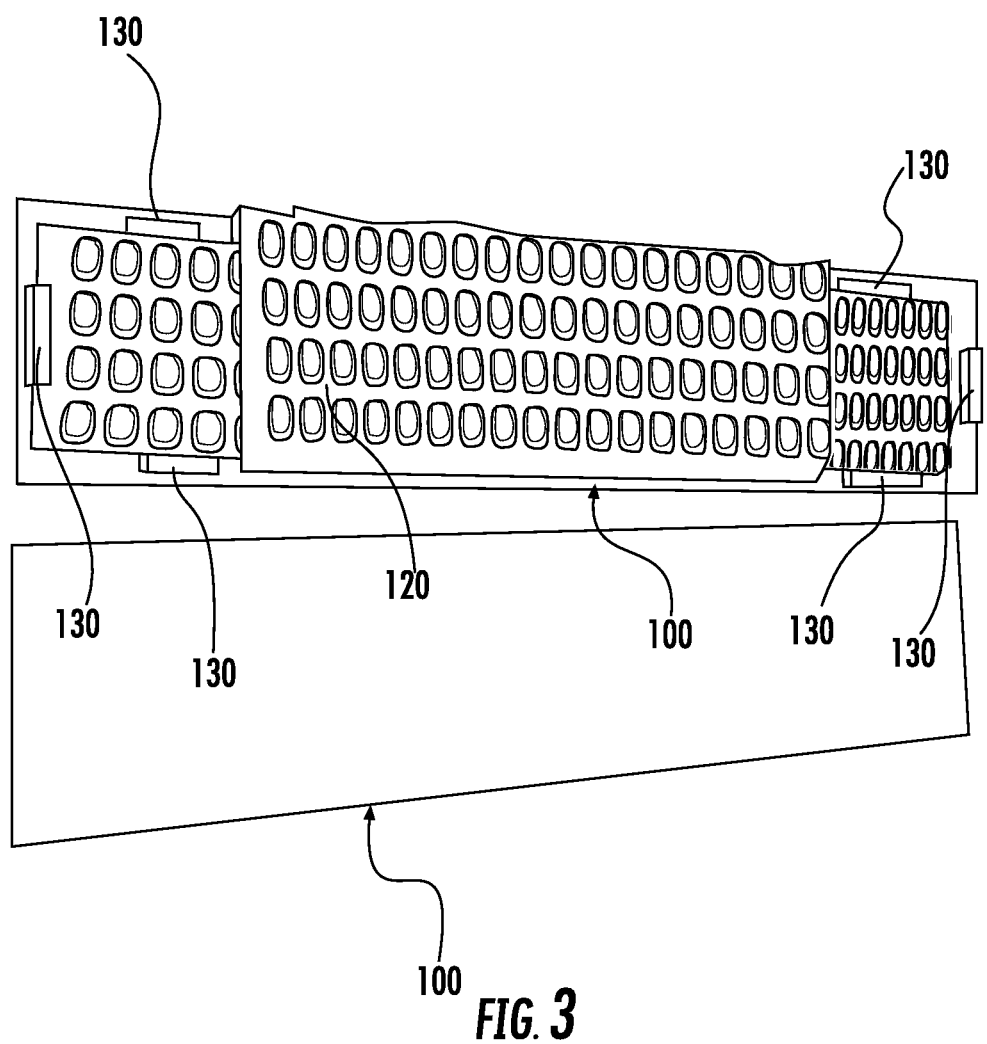
FIG. 3 illustrates front and back views of a fixture according to one embodiment described herein.

In addition, in some embodiments, the fixture is a load bar or a piece of molding. A "load bar," as referenced herein, can be a beam, bar or other structure having a similar configuration. Further, a load bar can be configured or adapted to carry a load, such as in the case of picture frames, artwork or other wall hangings which may be suspended from the load bar. In certain other embodiments, the load bar does not serve a load bearing or wall-hanging function. FIG. 3 illustrates a view of the front (bottom image) and a view of the back (top image) of a fixture (100) described herein wherein the fixture (100) is a load bar. As illustrated in FIG. 3, the fixture (100) comprises PCM (120) disposed on the back side and a plurality of spacers (130) positioned at various points around a periphery of the fixture (100) in order to define an air flow channel between the PCM (120) and the interior of the room upon installation (such as by defining a space between the back side of the fixture and a wall of the room). In addition to embodiments wherein the fixture is a load bar, the fixture can also be a piece of molding. Any type of molding can be used consistent with the objectives of the present disclosure. For example, crown molding or picture molding can be used.

In certain embodiments, the load bar or molding may have particular dimensions. For example, in some embodiments, a length of the load bar or molding is between about 2 feet and about 12 feet, such as between about 2 feet and about 6 feet, between about 3 feet and about 5 feet, between about 3 feet and about 6 feet, between about 3 feet and about 8 feet, between about 4 feet and about 6 feet, between about 2 feet and about 5 feet, or between about 2 feet and about 4 feet. A width of the load bar or molding can be between about 6 inches and about 18 inches, such as between about 8 inches and about 16 inches, between about 10 inches and about 14 inches, between about 6 inches and about 16 inches, between about 6 inches and about 14 inches, between about 6 inches and about 12 inches, between about 8 inches and about 18 inches, between about 10 inches and about 18 inches, or between about 12 inches and about 18 inches. In addition, a load bar or piece of molding can be disposed at a particular distance from the ceiling of the room. For example, in some embodiments, a top surface or top edge of the load bar or molding can be disposed between about 6 inches and about 30 inches below the ceiling, such as between about 9 inches and about 30 inches, between about 12 inches and about 30 inches, between about 18 inches and about 30 inches, or between about 24 inches and about 30 inches from the ceiling. Further, in some embodiments, the load bar or molding is disposed between about 6 inches and about 24 inches from the ceiling, such as between about 6 inches and about 20 inches, between about 6 inches and about 18 inches, or between about 6 inches and about 12 inches below the ceiling. A load bar or piece of molding can comprise or include artwork or other decorative designs. Any artwork or decorative design not inconsistent with the objectives of the present invention can be used. For example, painting, decals, sculpture, wall-hangings or the like can be used. In certain other embodiments, the load bar or molding does not comprise artwork.

Further, in some embodiments, the fixture is suspended from the ceiling of the room. For example, in some embodiments, the fixture can take the form of a drop ceiling or a drop sub-ceiling suspended from a drop ceiling. In some cases, a fixture described herein is a ceiling tile or a portion of a ceiling tile, such as a drop ceiling tile. In some such embodiments, the fixture is used in place of one or more normal ceiling tiles that would otherwise be used in the room, where a "normal" ceiling tile is understood to refer to a ceiling tile that is not a fixture described herein. In certain other embodiments, the fixture can be decorative or otherwise ornamental instead of being disposed in a drop-ceiling configuration. As in the case of the load bar or piece of molding, the top surface of such a fixture can be disposed at a particular distance from the ceiling. For example, in some embodiments, a top surface or top edge of the fixture can be disposed between about 6 inches and about 30 inches below the ceiling, such as between about 9 inches and about 30 inches, between about 12 inches and about 30 inches, between about 18 inches and about 30 inches, or between about 24 inches and about 30 inches from the ceiling. Further, in some embodiments, the top surface of the fixture is disposed between about 6 inches and about 24 inches from the ceiling, such as between about 6 inches and about 20 inches, between about 6 inches and about 18 inches, or between about 6 inches and about 12 inches below the ceiling.

Further, in some instances, a fixture described herein is an acoustic tile or part of an acoustic tile. Such an acoustic tile, in some cases, exhibits a Noise Reduction Coefficient (NRC) corresponding to at least a 40 percent absorption rate, at least a 50 percent absorption rate, or at least a 60 percent absorption rate. In some embodiments, an acoustic tile described herein has an NRC corresponding to a 40 to 90 percent absorption rate, 40 to 80 percent absorption rate, 50 to 85 percent absorption rate, 50 to 80 percent absorption rate, 50 to 60 percent absorption rate, 60 to 80 percent absorption rate, 60 to 70 percent absorption rate, or 70 to 80 percent absorption rate.

A fixture utilized in a method described herein can be disposed or provided at one or more locations within the room in order to adapt or adjust temperature management to a particular room setup or configuration. For example, in some embodiments, the fixture is disposed proximate to a heat source. "Proximate," for reference purposes herein, can refer to an effective distance from the heat source. For example, a fixture disposed proximate a heat source can be less than 6 feet from the heat source, such as less than about 3 feet from the heat source. A fixture can be disposed between about 6 inches and about 5 feet from the heat source, between about 6 inches and about 4 feet from the heat source, between about 6 inches and about 3 from the heat source, or between about 6 inches and about 2 feet from the heat source. Moreover, the fixture can be disposed less than 6 inches from the heat source, including embodiments wherein the fixture is between about 0.5 inches and about 6 inches from the heat source. Not intending to be bound by theory, it is believed that placement of the fixture proximate or near a heat source can facilitate a temperature change buffer effect provided by the PCM disposed on or within the fixture. A "heat source," for reference purposes herein, can be any source of heat or thermal energy. For example, the heat source can be an appliance such as a television, refrigerator, or toaster, an HVAC vent, a light bulb or fixture, a window, or a combination thereof. The heat source may also be associated with an occupant of the room or occupancy of the room by humans more generally. For instance, in some cases, a heat source can be a high traffic or high occupancy area or volume of the room, such as a corridor of the room or another region of the room in which human occupants are relatively likely to be present. Moreover, in some embodiments, the fixture can be disposed on an upper half of a wall of the room. Further, in some embodiments, the fixture can be disposed on an upper quarter of the wall. Not intending to be bound by theory, it is believed that such placement can facilitate energy absorption by the PCM as a result of proximity of the PCM to the warmer air which may rise to the upper half of the room.

Additionally, in some embodiments, it may be desirable to provide a particular amount of PCM for a given thermal capacity or thermal load for a given room. In some embodiments, the thermal capacity or thermal load of a room can be related to one or more factors including the square footage (or, more generally, the area) of floor space of a room, the cubic footage (or, more generally, the volume) of the room or of temperature-managed air in the room, the number of heat sources in the room, or other factors which may impact the thermal capacity of the room. In some embodiments, this amount of PCM may be expressed as a particular ratio of an amount of PCM to a floor area or an air volume of the room (which may be referred to as a "room density" of the PCM). An amount of PCM may also be expressed as a particular ratio of amount of PCM to fixture area or fixture volume (which may be referred to as a "fixture density" of the PCM). Moreover, an amount of PCM disposed within the room or within the fixture can, in some embodiments, be selected which corresponds to a heat capacity of the room or to a desired number of PCM phase transitions that occur within a single "charging-discharging" cycle of the fixture or PCM of the fixture. A "charging-discharging cycle," for reference purposes herein, includes the steps of using a phase transition (e.g., a solid-to-liquid or solid-to-gel phase transition) of the PCM of a fixture described herein to absorb heat from (or release heat to) a room in a first direction of temperature change, and then subsequently using the opposite phase transition (e.g., a liquid-to-solid or gel-to-solid phase transition) of the PCM to release heat to (or absorb heat from) the room. For example, in an embodiment wherein a room has an average ceiling height from the floor of between about 8 feet and about 10 feet, such as may be the case in a hotel room, an effective or preferred amount of PCM can be selected based on the thermal capacity of the room as determined by square footage of the room and/or based on a desired degree of charging or discharging required of the PCM in view of the thermal capacity of the room or a desired increase or decrease of temperature within the room.

In some embodiments, for example, an amount of PCM disposed within the room is between about 0.05 lbs. and 0.15 lbs. per square foot of floor space in the room, such as between about 0.06 lbs. and about 0.15 lbs. per square foot, between about 0.07 lbs. and about 0.15 lbs. per square foot, between about 0.08 lbs. and about 0.15 lbs. per square foot, or between about 0.09 lbs. and about 0.15 lbs. per square foot of floor space in the room. Additionally, in some embodiments, an amount of PCM disposed within the room is between about 0.05 lbs. and about 0.14 lbs. per square foot of floor space in the room, between about 0.05 lbs. and about 0.13 lbs. per square foot, or between about 0.05 lbs. and about 0.12 lbs. per square foot of floor space in the room. Moreover, in some embodiments, an amount of PCM disposed within a room is between about 0.15 lbs. and about 0.35 lbs. per square foot of floor space in the room, such as between about 0.2 lbs. and about 0.3 lbs. per square foot, between about 0.25 lbs. and about 0.3 lbs. per square foot, between about 0.15 lbs. and about 0.25 lbs. per square foot, or between about 0.15 lbs. and about 0.2 lbs. per square foot of floor space in the room. In other embodiments, an amount of PCM disposed within a fixture is between about 0.2 lbs. and 0.9 lbs. per square foot of the fixture, between about 0.3 lbs. and 0.8 lbs. per square foot of the fixture, or between about 0.33 lbs. and 0.75 lbs. per square foot of the fixture, where the area "of the fixture" is the largest cross-sectional area of the fixture (such that, e.g., a rectangular fixture having an average length l, an average width w, and an average thickness or height h would have an "area" corresponding to the greatest of lw, lh, and wh).

In some cases, the use of between about 0.15 lbs. and about 0.35 lbs. of PCM per square foot of floor space of the room (assuming a ceiling height of 8-10 feet) and/or the use of between about 0.33 lbs. and about 0.75 lbs. of PCM per square foot of the fixture is especially preferred, particularly when the PCM has a phase transition enthalpy between about 100 kJ/kg and about 220 kJ/kg.

Additionally, in some embodiments, the total square footage (or, more generally, the total area) of the PCM-containing fixtures used in a room can be selected based on the use of PCM in an amount described above. For example, in some cases, the total square footage (or area) of fixtures used in a room according to an embodiment described herein is determined according to Equation (1):

$$\text{Total Fixture Area} = \frac{R \times C \times O}{M}, \quad (1)$$

where R is the area (e.g., square footage) of the floor space of the room, C is the average ceiling height (e.g., in feet) of the room, O is a PCM room density factor, and M is a PCM fixture density factor. In general, the PCM room density factor O is obtained by converting a room density value above (such as 0.15 lbs. of PCM per square foot of floor space) into a PCM room density factor by dividing the room density value by 10. Thus, a room density value of 0.15 lbs. of PCM per square foot of floor space provides a room density factor O of 0.015. Further, the PCM room density factor O has units of "per length" (e.g., per foot). The PCM fixture density factor M is obtained by converting a fixture density value above (such as 0.75 lbs. of PCM per square foot of fixture) into a unitless PCM fixture density factor by removing the units. Thus, a fixture density value of 0.75 lbs. of PCM per square foot of fixture provides a fixture density factor M of 0.75. It is further to be understood that the "Total Fixture Area" of Equation (1) corresponds to the sum of the areas of all fixtures used in the room. Thus, if a first fixture having dimensions of 2 ft.×3 ft., a second fixture having dimensions of 4 ft.×5 ft., and a third fixture having dimensions of 6 ft.×3 ft. are all used in the room, then the total fixture area would be 44 sq. ft. (6 sq. ft.+20 sq. ft.+18 sq. ft.).

Surprisingly, it has been found that, in some instances, using too large a quantity of PCM in a room can increase the amount of energy necessary to manage the temperature of the room relative to smaller quantities. Similarly, using too little PCM can reduce the efficacy of methods described herein relative to an effective amount per unit of thermal capacity or thermal load. It has also been surprisingly found that, in some cases, using PCM that is too highly dispersed (that is, PCM in a physical form having too high of a total surface to volume ratio or total surface area to weight ratio), or that is not dispersed enough, can further reduce the efficacy of methods described herein. For HVAC/mechanically controlled environments or rooms, the temperature of intake air (air entering the room) is typically about 55° F. (for cooling applications) or about 90° F. (for heating applications). A typical set point or thermostat setting for such a room is about 70° F. Therefore, there is typically a somewhat limited difference in temperature (ΔT) between the set point and the intake air temperature, corresponding to approximately 15-20° F. It has surprisingly been discovered that, to most effectively use PCM to manage the temperature of a room (particularly a room whose temperature is regulated by an HVAC system), it is desired to provide a relatively large number of opportunities for "partial" PCM phase transitions during heating/cooling or charging/discharging cycles, where a "partial" PCM phase transition refers to a phase transition in which some but not all of a specific continuous portion of PCM undergoes a phase transition. For example, a "partial" PCM phase transition can occur when a discrete "plug" or "cube" of PCM weighing 10 g absorbs heat from a room and less than 10 g of the PCM, but more than 0 g of the PCM, undergoes a phase transition (e.g., melts) as a result of absorbing the heat. In some cases, only an outer portion or "skin" of a plug or portion of PCM undergoes a phase transition. Such an outer portion or "skin," in some embodiments, comprises up to 50 percent, up to 40 percent, up to 30 percent, up to 20 percent, up to 15 percent, up to 10 percent, or up to 5 percent of the total volume or mass of the plug or portion of PCM. In some instances, the outer portion or skin of the discrete plug of PCM comprises 1-50 percent, 1-40 percent, 1-30 percent, 1-20 percent, 1-10 percent, 1-5 percent, 5-50 percent, 5-40 percent, 5-30 percent, 5-20 percent, 5-10 percent, 10-50 percent, 10-40 percent, 10-30 percent, 10-20 percent, 15-50 percent, 15-40 percent, 15-30 percent, 20-50 percent, 20-40 percent, or 20-30 percent of the total volume or mass of the discrete plug of PCM. The number of opportunities for such partial PCM phase transitions can be at least partially controlled by combining a room density of PCM and/or a fixture density of PCM described herein with a desired ΔT. As described above, it has been surprisingly discovered that the use of between about 0.15 lbs. and about 0.35 lbs. of PCM per square foot of floor space of the room (assuming a ceiling height of 8-10 feet) and/or the use of between about 0.33 lbs. and about 0.75 lbs. of PCM per square foot of the fixture is especially preferred, particularly when the PCM has a phase transition enthalpy between about 100 kJ/kg and about 220 kJ/kg, and particularly for a desired or typical ΔT of 15-20° F. Using PCM that is too dispersed or that has too low of a fixture density (e.g., such that the PCM is very thinly distributed within the fixture area) and/or that has too low of a room density can provide a total latent heat within the room that is too low to provide a meaningful effect when the difference between a desired temperature or set point of the room and the actual temperature of the room is relatively high (e.g., greater than 25° F. or greater than 30° F.), such as may occur when the HVAC system is off or entirely missing, when power is lost, or when the room is unoccupied or unused. Similarly, using PCM that has too high of a fixture density or too high of a room density can result in impossible, impractical, or energetically inefficient "recharging" of the entirety of the PCM (where "recharging" refers to reversing a phase transition of the PCM such that the PCM is ready to be used again to heat or cool the room), as described further hereinbelow.

Moreover, as described above, a method described herein can further comprise changing the phase of the PCM from a first phase to a second phase by exposing the PCM to a temperature in the room above (or below) a phase change temperature of the PCM. Additionally, in some instances, the method can further comprise reverting or returning the PCM to the first phase. The first phase and the second phase may be selected from any of the phases or mesophases described hereinabove. Additionally, the PCM can be reverted or returned to the first phase in any manner not inconsistent with the objectives of the present disclosure. For example, in some cases, reverting the PCM to the first phase comprises cooling (or heating) the room naturally, such as by exposing the room to the outdoors or to a day-night cycle. Not intending to be bound by theory, it is believed that the presence of the PCM-containing fixture in the room during such a day-night cycle (or plurality of cycles) can help maintain the temperature of the room at a more constant, less varying level, with or without the use of an HVAC system or thermostat in the room. Thus, in some embodiments, a method described herein can improve the average temperature and/or the human habitability of a room lacking an HVAC system or a room having an HVAC system with a thermostat set point that is warmer (or colder) than the usual seasonal comfort level for the room. Such a method may be particularly useful for unoccupied hotel rooms.

In other embodiments, reverting the PCM to the first phase comprises cooling (or heating) the room with an HVAC system. In such an instance, the presence of the PCM-containing fixture in the room can help reduce the number of on-off or activation-deactivation cycles of the HVAC system needed to maintain the temperature of the room at a given thermostat set point. Thus, in some cases, a method described herein can further comprise reducing a number of heating cycles or cooling cycles required to maintain a constant predetermined or desired temperature range in the interior of the room. Alternatively or additionally, a method described herein can also comprise shortening the heating or cooling cycles required to maintain the predetermined or desired temperature range. "Shortening" a heating or cooling cycle, for reference purposes herein, refers to decreasing the difference between a lowermost temperature during the cycle and an uppermost temperature of the cycle. Surprisingly, it has been found that an overall energy savings can be realized by such a method, despite the need, in some cases, to use the HVAC system to expend additional energy to "recharge" or revert the PCM back to a first phase following a phase change transitions of the PCM.

It is to be understood that fixtures and methods described herein can be used to help maintain a desired temperature or range of temperatures in any type of room or space not inconsistent with the objectives of the present disclosure. For example, in some cases, a fixture and/or method described herein may be used in a residence, a hotel room, an office, a restaurant dining area, a restaurant kitchen or food preparation area, a supermarket, a grocery store or other store, a school, a classroom, a conference room, or a lobby. A fixture and/or method described herein may also be used in a data room or data center. Non-limiting examples of specific uses of a fixture and/or method described herein include using a fixture described herein as a banner or menu board in or above a restaurant food preparation area; using a fixture described herein as artwork in a restaurant dining area; using a fixture described herein as a display board or advertisement board in a supermarket; using a fixture described herein as artwork, molding, or a load bar in a hotel room; and using a fixture described herein as a smart board or other board in a classroom, conference room, or lobby. Other uses are also possible.

Some embodiments described herein are further illustrated in the following non-limiting example.

EXAMPLE

Methods of Managing the Temperature of a Room

Figure 4:
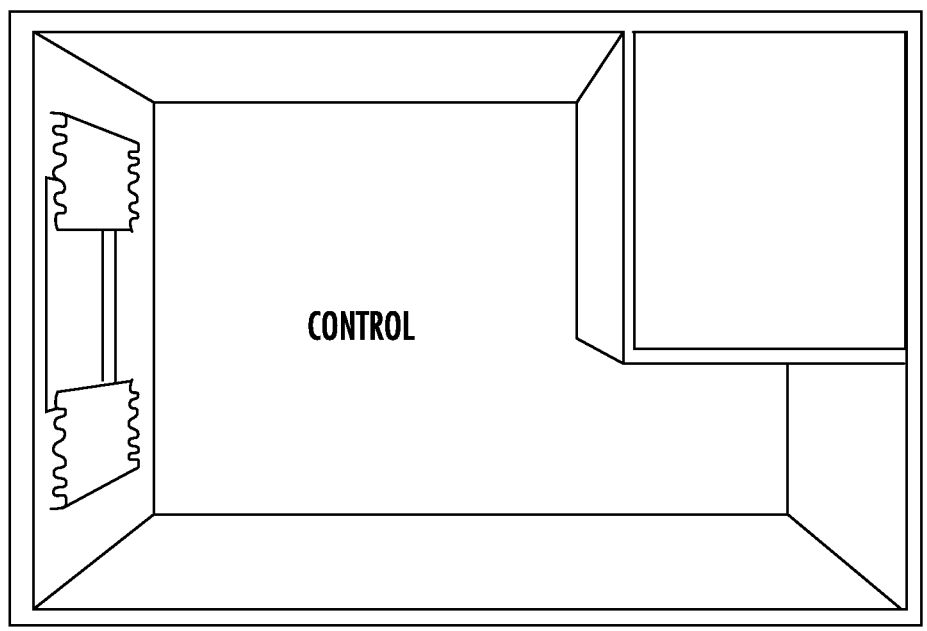
FIG. 4 illustrates a top plan view of a comparative room configuration.
Figure 5:
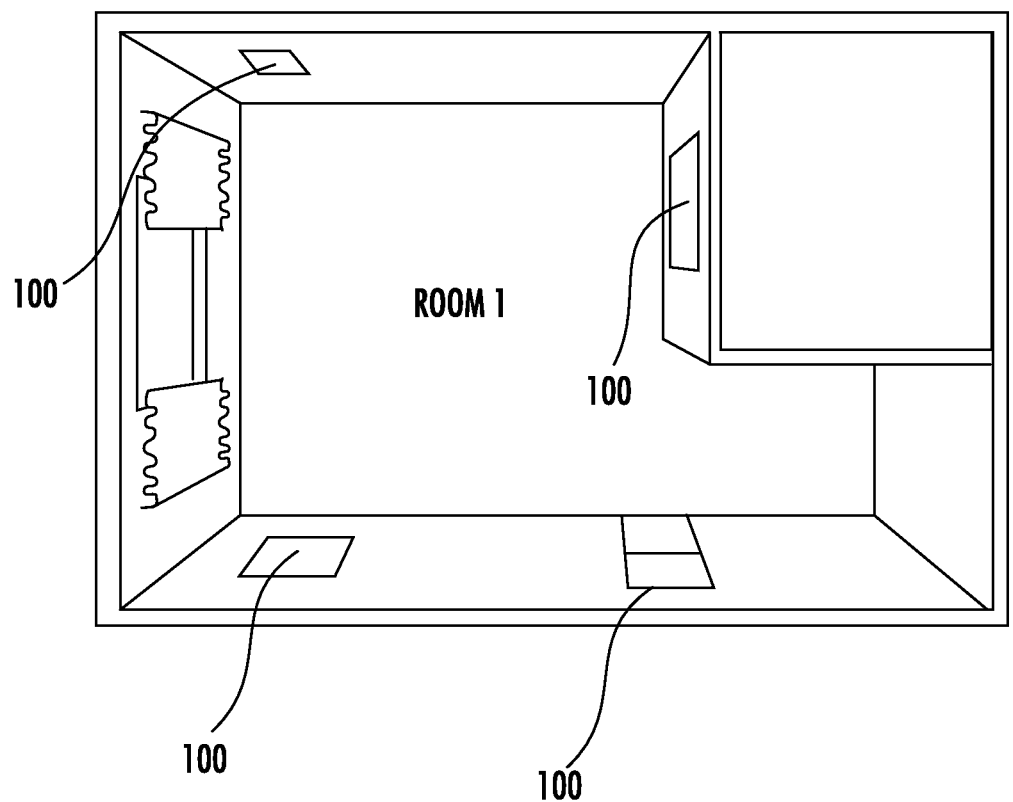
FIG. 5 illustrates a top plan view of a room including fixtures according to one embodiment of a method described herein.
Figure 6:
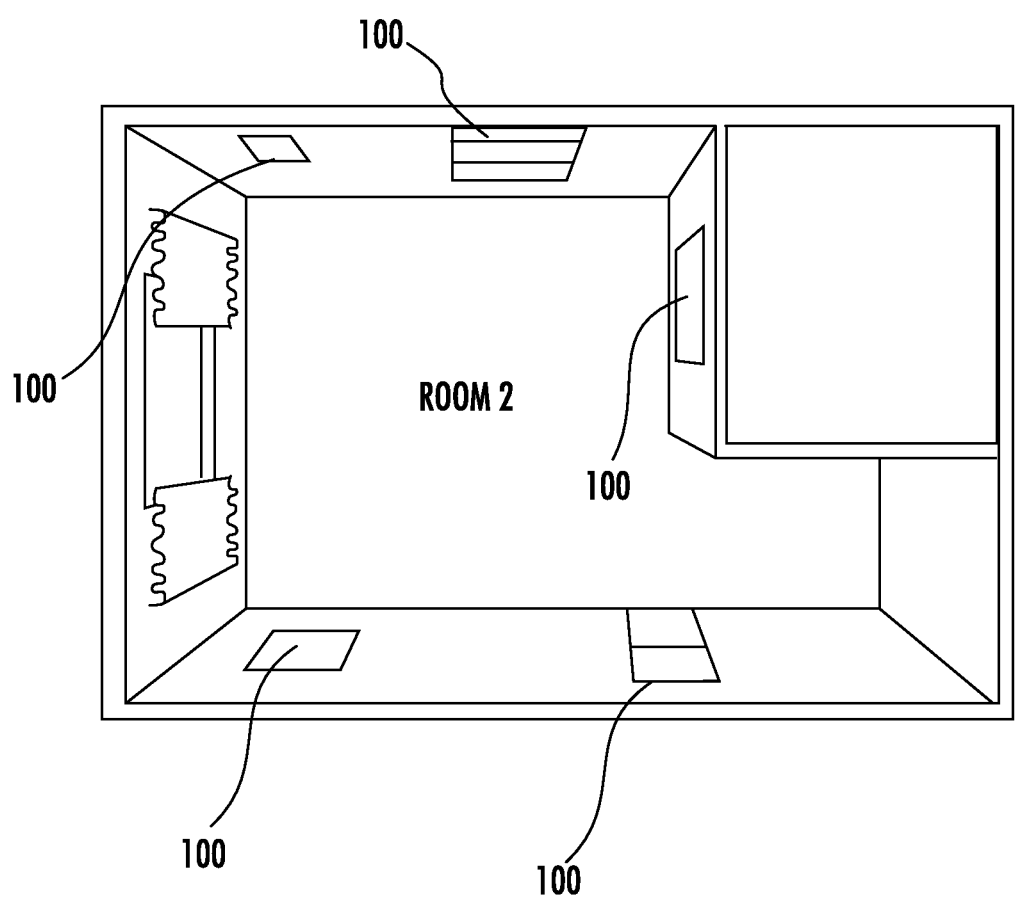
FIG. 6 illustrates a top plan view of a room including fixtures according to one embodiment of a method described herein.
Figure 7:
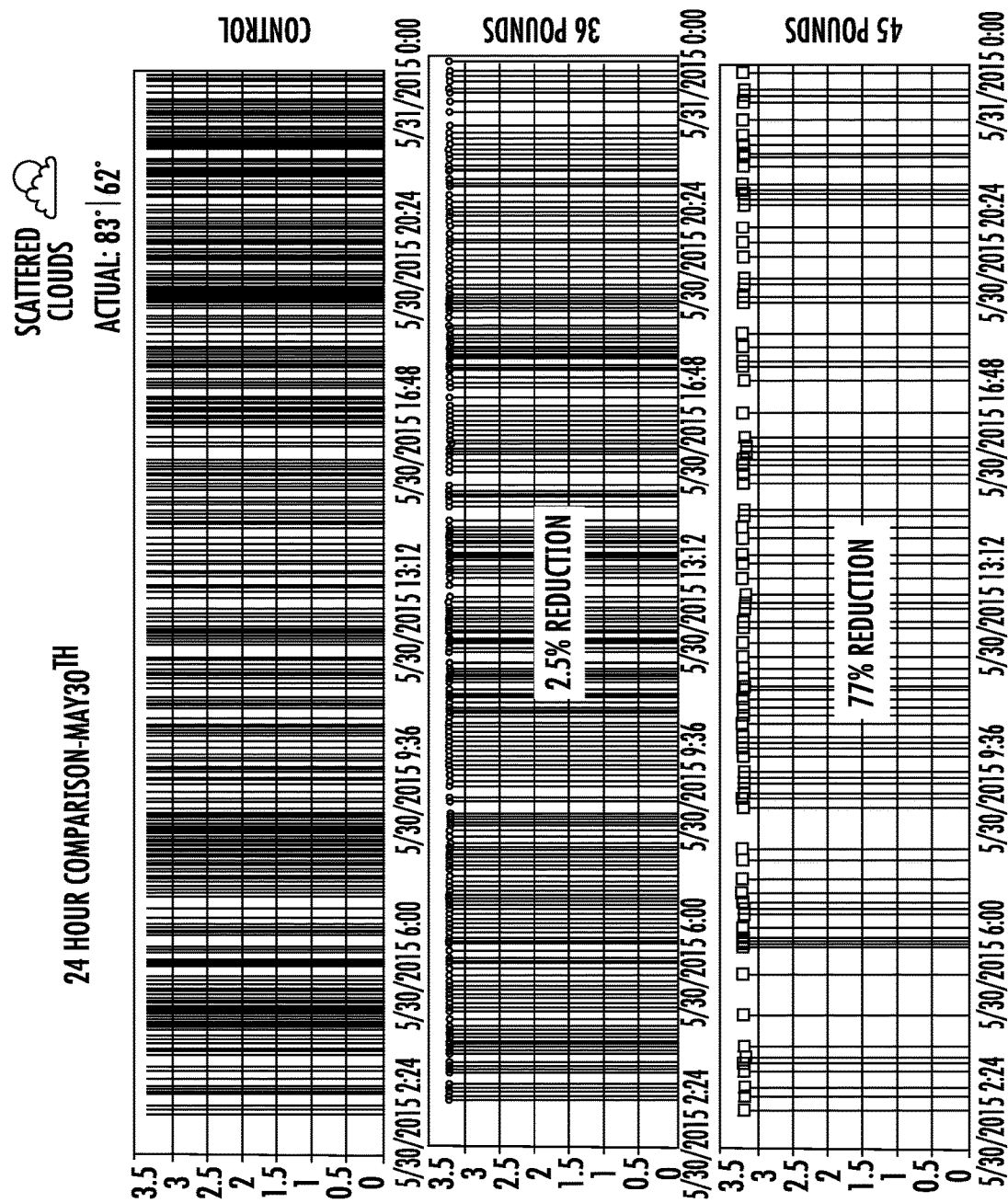
FIG. 7 illustrates test results for some embodiments of a method described herein.
Figure 8:
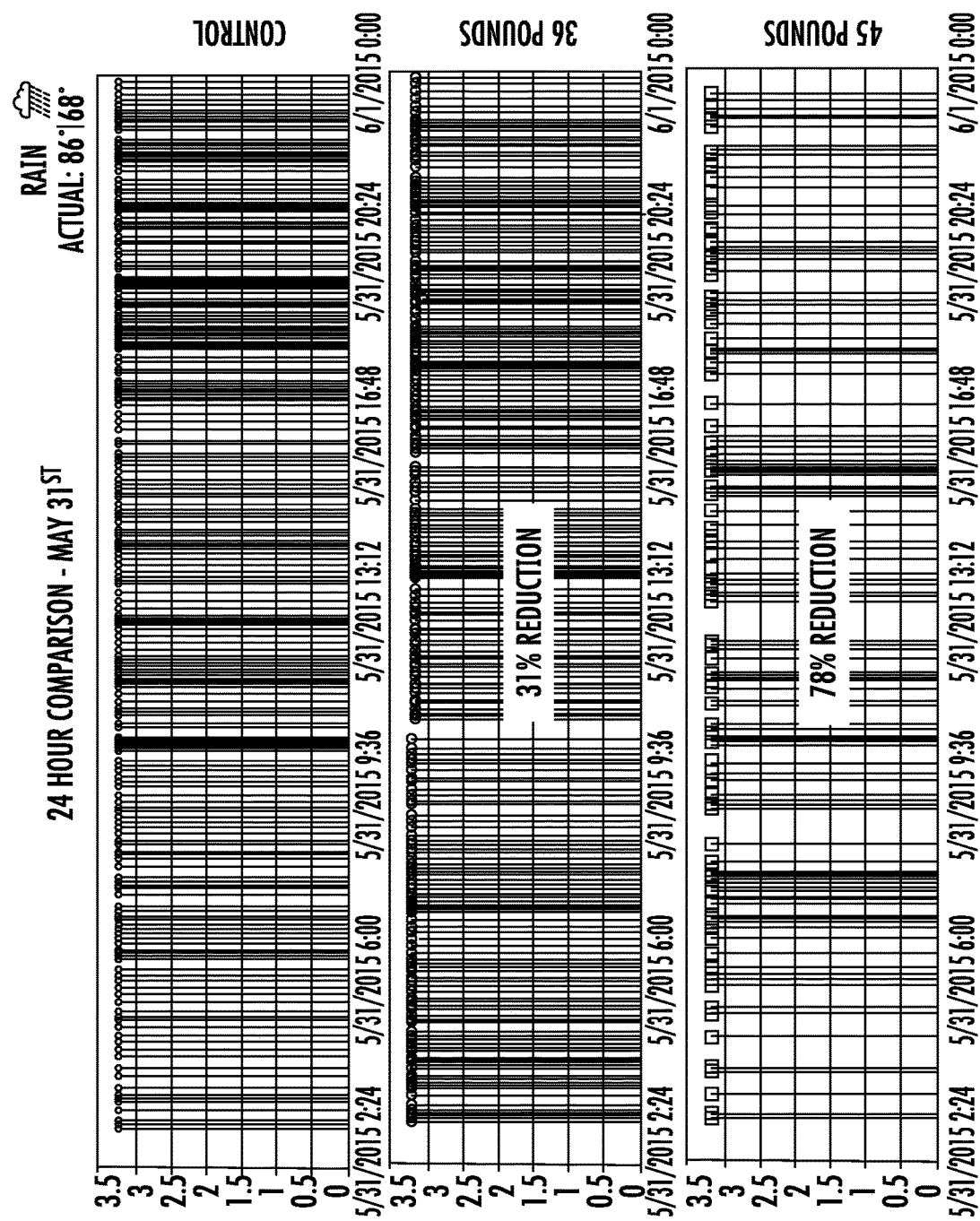
FIG. 8 illustrates test results for some embodiments of a method described herein.
Figure 9:
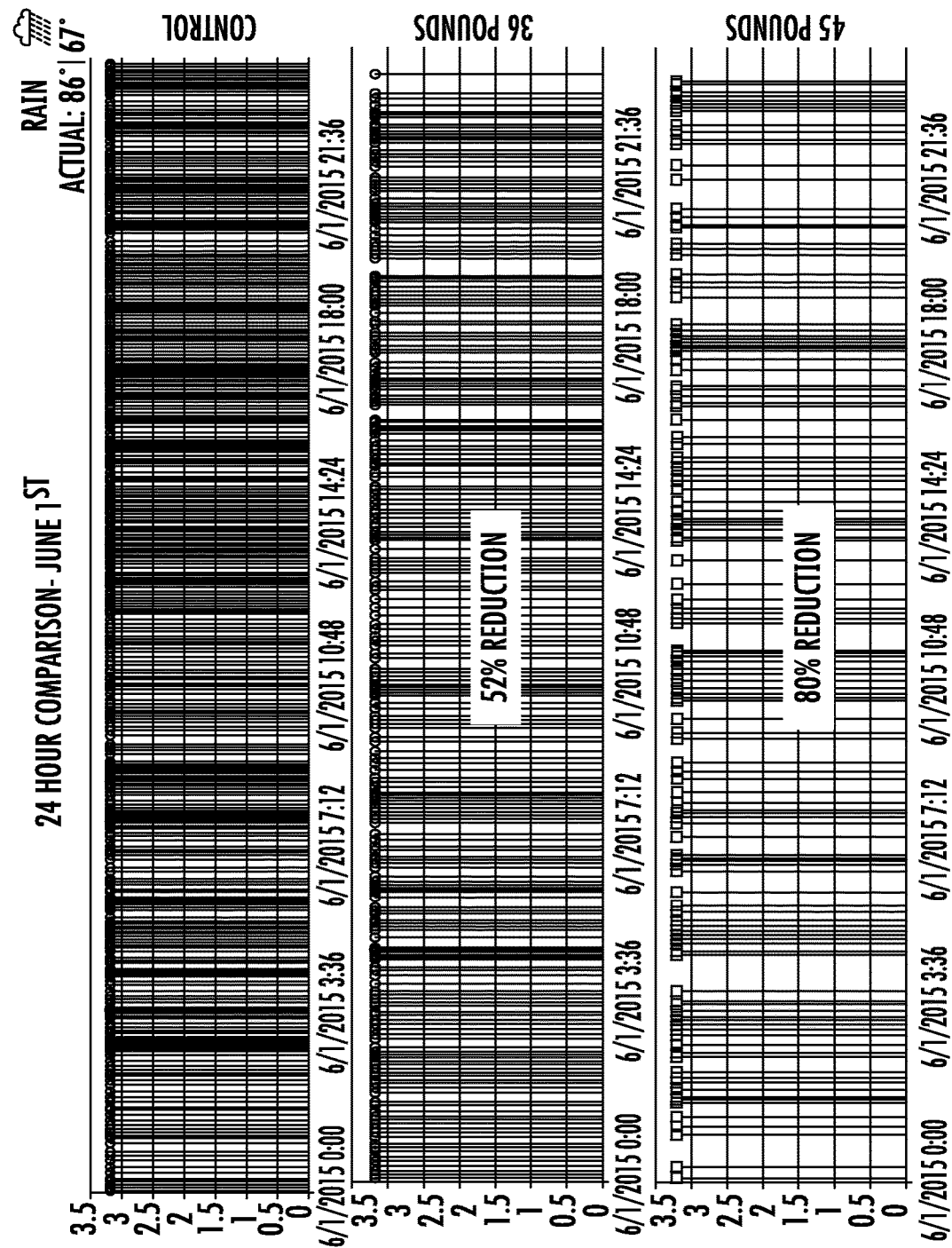
FIG. 9 illustrates test results for some embodiments of a method described herein.
Figure 10:
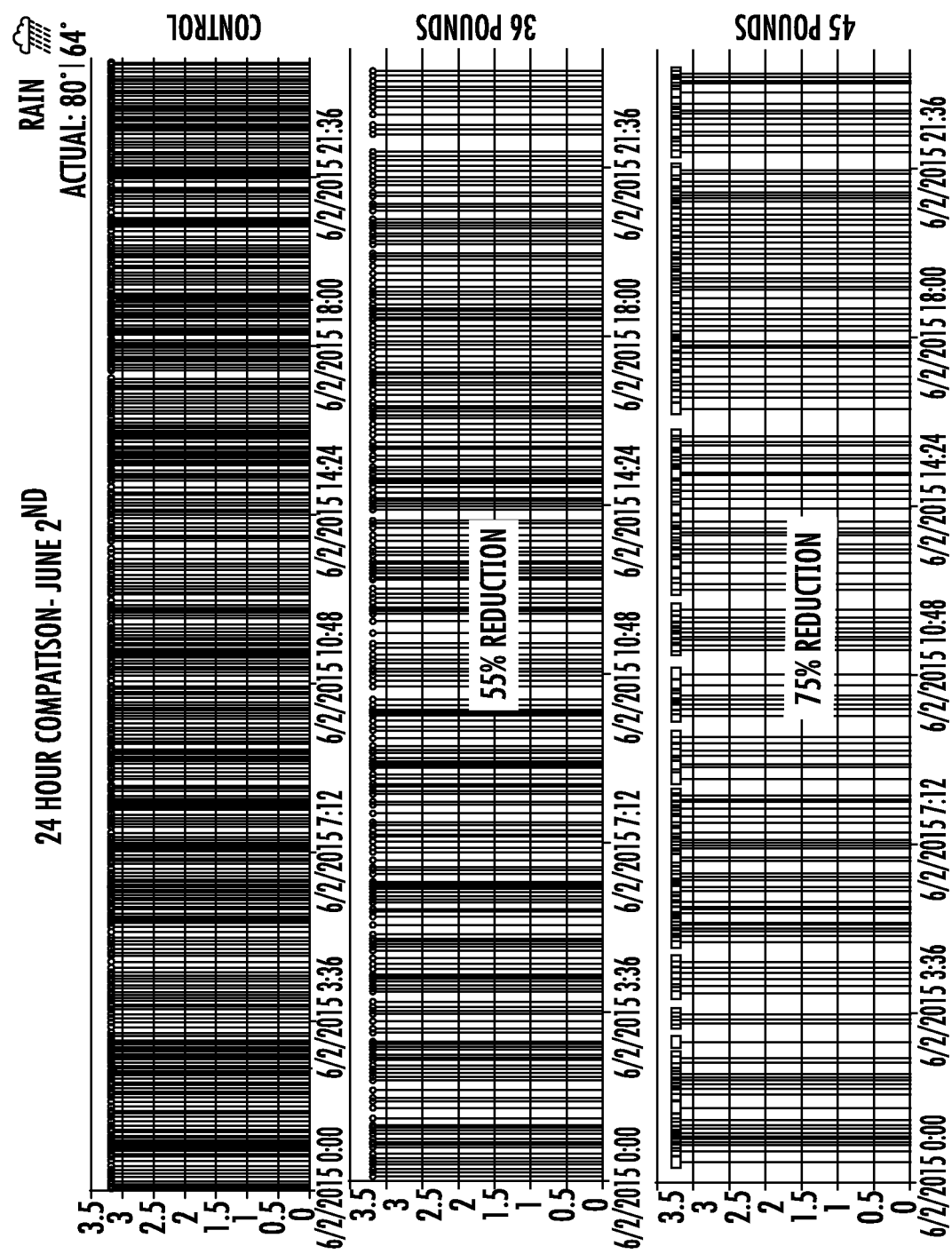
FIG. 10 illustrates test results for some embodiments of a method described herein.
Figure 11:
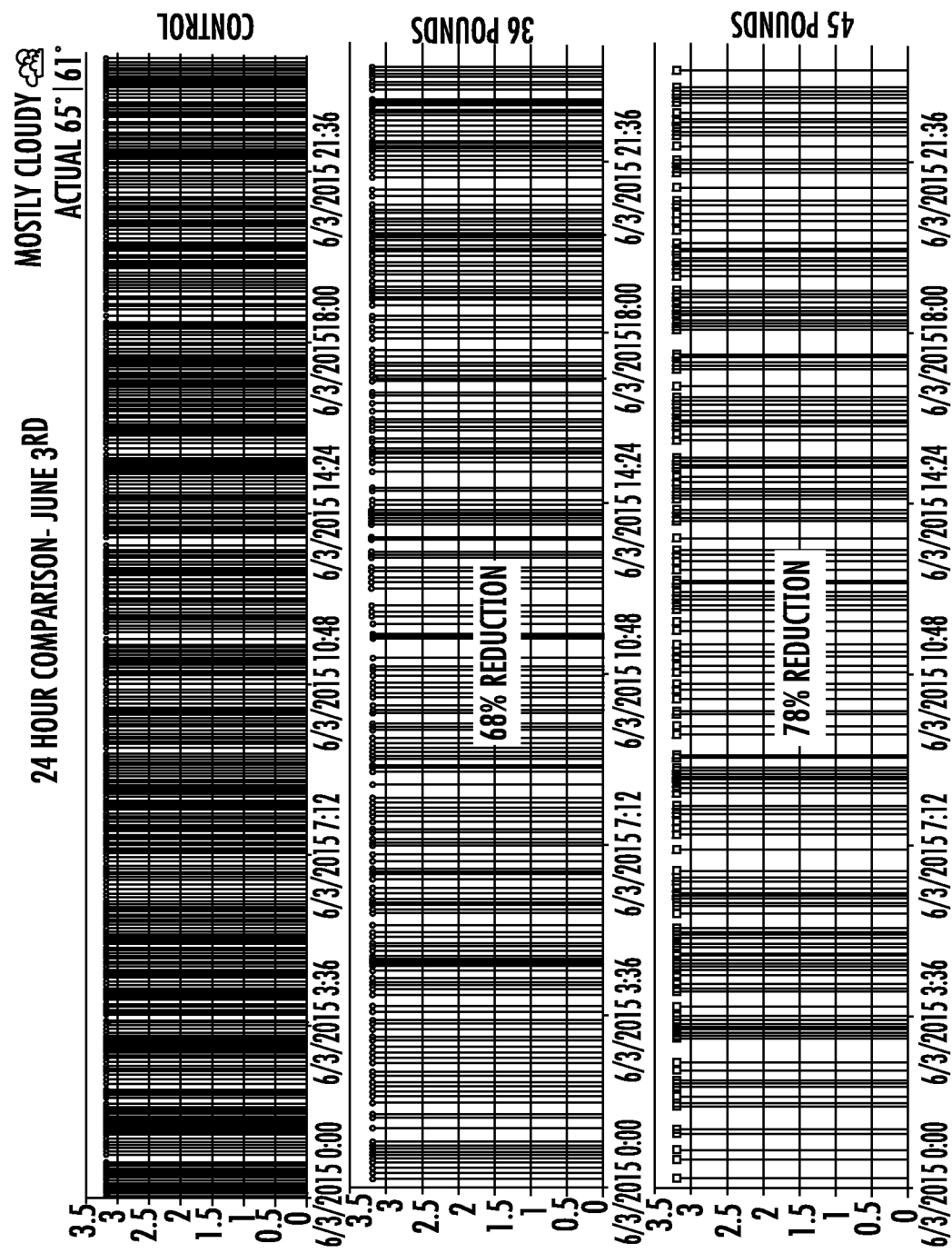
FIG. 11 illustrates test results for some embodiments of a method described herein.
Figure 12:
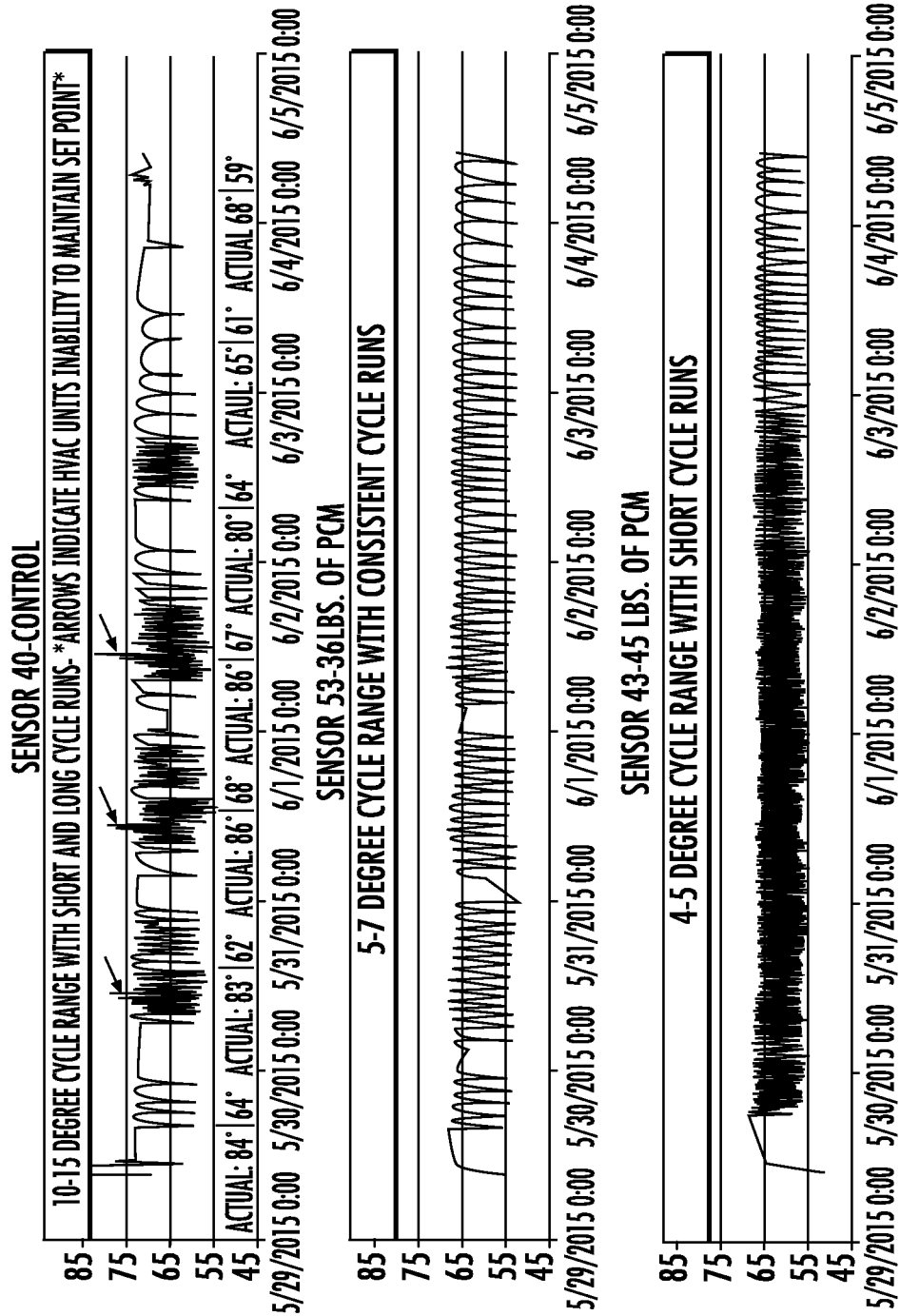
FIG. 12 illustrates test results for some embodiments of a method described herein.

Three rooms of substantially the same size were selected in a commercial hotel. In each of the rooms, either no fixtures comprising a PCM were disposed therein (control) or a varied configuration of fixtures comprising PCM were disposed therein. FIG. 4 illustrates a control configuration in which the room was left devoid of fixtures comprising PCM. FIG. 5 illustrates Room 1 having a variety of fixtures (100) disposed therein containing a total of about 36 pounds of PCM disposed throughout the 400 square foot room. FIG. 6 illustrates Room 2 having a differing configuration of a variety of fixtures (100) disposed therein containing a total of about 45 pounds of PCM disposed throughout the 400 square foot room. Table I below provides the fixtures and total square footage of PCM placed on or within the fixtures in Room 1. Table II below provides the fixtures and total square footage of PCM placed on or within the fixtures in Room 2. It is to be understood that 48 square feet of PCM corresponded to 36 lbs. of PCM, and 60 square feet of PCM corresponded to 45 lbs. of PCM. FIGS. 1 and 2 illustrate the PCM configurations utilized in the fixtures disposed in each of Rooms 1 and 2.

TABLE I

Fixtures in Room 1

| Fixture | Width (ft.) of Fixture | Length (ft.) of Fixture | Square Feet of PCM |
| --- | --- | --- | --- |
| Mirror (Large) | 3 | 3 | 9 |
| Mirror (Small) | 2 | 3 | 6 |
| Glass Artwork (Large) | 3 | 5 | 15 |
| Glass Artwork (Small) | 3 | 3 | 9 |
| Mirror (Large) | 3 | 3 | 9 |
| Total Feet | | | 48 |

TABLE II

Fixtures in Room 2

| Fixture | Width (ft.) of Fixture | Length (ft.) of Fixture | Square Feet of PCM |
| --- | --- | --- | --- |
| Mirror (Large) | 3 | 3 | 9 |
| Mirror (Large) | 3 | 3 | 9 |
| Mirror (Large) | 3 | 3 | 9 |
| Glass Artwork (Large) | 3 | 5 | 15 |
| Glass Artwork (Small) | 3 | 3 | 9 |
| Load Bar | 1 | 4 | 4 |
| Load Bar | 1 | 4 | 4 |
| Load Bar | 1 | 4 | 4 |
| Total Feet | | | 63 |

Each of the three rooms was maintained in this configuration over a 7 day period. The actual high temperature, low temperature, and cloud cover experienced at the commercial hotel for each of the 7 days is provided below in Table III.

TABLE III

Weather Conditions

| Day | High (° F.) | Low (° F.) | Cloud Conditions |
| --- | --- | --- | --- |
| 1 | 84 | 64 | Scattered Clouds |
| 2 | 83 | 62 | Scattered Clouds |
| 3 | 86 | 68 | Rain |
| 4 | 86 | 67 | Rain |
| 5 | 80 | 64 | Rain |
| 6 | 65 | 61 | Mostly Cloudy |
| 7 | 68 | 59 | Overcast |

During the 7 day test period, the run time of the HVAC system to maintain a set point of 70° F. was measured. In the control room, the HVAC system ran for a measured time of 38.7 hours over the test period, utilizing a calculated energy of 27.2 kWh. The same system ran in Room 1 for 21.7 hours over the test period, using a calculated amount of energy of 15.3 kWh, a 43.8% reduction compared to the control. The HVAC system of Room 2 ran for a measured time of 8.8 hours over the test period, utilizing a calculated energy of 6.2 kWh, a 77% reduction compared to the control. FIGS. 7-12 illustrate additional results of the test, including on-off times for the three rooms.

Various implementations of apparatus and methods have been described in fulfillment of the various objectives of the present disclosure. It should be recognized that these implementations are merely illustrative of the principles of the present disclosure. Numerous modifications and adaptations thereof will be readily apparent to those skilled in the art without departing from the spirit and scope of the present disclosure. For example, individual steps of methods described herein can be carried out in any manner and/or in any order not inconsistent with the objectives of the present disclosure, and various configurations or adaptations of apparatus described herein may be used.

That which is claimed is:

1. A method of managing the temperature of a room having a wall and a ceiling, the method comprising:

disposing a fixture comprising a phase change material in an interior of the room, wherein the phase change material is provided in an amount between 0.15 lbs. and 0.35 lbs. per square foot of floor space in the interior of the room, wherein the total area of fixtures comprising a phase change material in the room is selected according to the equation:

Total Fixture Area=$(R \times C \times O)/M$, wherein R is the area of the floor space of the room, C is the average ceiling height of the room, O is a PCM room density factor, and M is a PCM fixture density factor;

wherein the PCM room density factor O is obtained by converting a room density value into a PCM room density factor by diving the room density value by 10 and setting the units to per length; and wherein the PCM fixture density factor M is obtained by converting a fixture density value into a unitless PCM fixture density factor by removing the units.

2. The method of claim 1, wherein the fixture is a picture, a painting, a print, or a sculpture.

3. The method of claim 1, wherein the fixture is a mirror.

4. The method of claim 1, wherein disposing the fixture in the room comprises hanging the fixture from the wall.

5. The method of claim 1, wherein:

the fixture comprises a frame defining a periphery and a cavity; and the phase change material is disposed within (i) the interior of the periphery and/or (ii) the cavity.

6. The method of claim 1, wherein the fixture comprises a spacer that defines an air flow channel that permits air flow from the interior of the room to the phase change material and from the phase change material to the interior of the room.

7. The method of claim 1, wherein the fixture defines at least one vent hole that permits air flow from the interior of the room to the phase change material and from the phase change material to the interior of the room.

8. The method of claim 1, wherein the fixture comprises at least one fan that directs air flow from the interior of the room to the phase change material and from the phase change material to the interior of the room.

9. The method of claim 1, wherein the fixture comprises a night light or a safety light.

10. The method of claim 1, wherein the fixture comprises:

at least one fan that directs air flow from the interior of the room to the phase change material and from the phase change material to the interior of the room;

a light source; and a photovoltaic cell that powers at least one of the fan and the light source.

11. The method of claim 1, wherein the fixture is an item of furniture or a portion of an item of furniture.

12. The method of claim 1, wherein the fixture is a load bar or a molding.

13. The method of claim 1, wherein the fixture is suspended from the ceiling.

14. The method of claim 1, wherein the phase change material is provided in an amount between 0.33 lbs. and 0.75 lbs. per square foot of the fixture, wherein the area of the fixture is the largest cross-sectional area of the fixture.

15. The method of claim 1 further comprising:

changing the phase of the phase change material from a first phase to a second phase by exposing the phase change material to an ambient temperature of the room above a phase change temperature of the phase change material; and reverting the phase change material to the first phase by cooling the room with an HVAC system of the room.

16. The method of claim 1, wherein:

the fixture has a back side and a decorative front side; and the phase change material is disposed on the back side of the fixture.

17. The method of claim 16, wherein the front side is formed of a breathable material.

18. The method of claim 16, wherein the front side is formed of a non-breathable material.

19. The method of claim 1 further comprising:

changing the phase of the phase change material from a first phase to a second phase by exposing the phase change material to an ambient temperature in the room below a phase change temperature of the phase change material; and reverting the phase change material to the first phase by heating the room with an HVAC system of the room.

20. The method of claim 19, wherein the HVAC system is activated or deactivated by a thermostat disposed within the interior of the room.

* * * * *